United States Patent [19]

Lin et al.

[11] Patent Number: 4,866,659
[45] Date of Patent: Sep. 12, 1989

[54] METHOD FOR SELECTION OF MINING AND DRILLING SITES USING SYNTHESIZED THREE DIMENSIONAL SEISMIC DATA

[75] Inventors: Jia-Wen Lin, Houston; Tom C. Holloway, Katy, both of Tex.

[73] Assignee: Pennzoil Company, Houston, Tex.

[21] Appl. No.: 24,598

[22] Filed: Mar. 9, 1987

Related U.S. Application Data

[63] Continuation-in-part of Ser. No. 597,598, Apr. 6, 1984, Pat. No. 4,672,545.

[51] Int. Cl.$^4$ .......................... G01V 1/00; G01V 1/32
[52] U.S. Cl. ...................................... 364/421; 367/61; 367/73
[58] Field of Search .................. 364/421, 422; 367/61, 367/73

[56] References Cited

U.S. PATENT DOCUMENTS 4,241,429 12/1980 Bloomquist ............................ 367/52
4,415,999 11/1983 Mocket et al. ......................... 367/73
4,672,545 6/1987 Lin et al. ............................. 364/421

Primary Examiner—Jerry Smith
Assistant Examiner—Charles B. Meyer

Attorney, Agent, or Firm—Lowe, Price, LeBlanc, Becker & Shur

[57] ABSTRACT

A method is disclosed for converting seismic data obtained at known points to synthesized seismic traces obtainable at arbitrarily selected points. Two dimensional seismic data are converted to dense three dimensional data with the aid of a programmed computer to permit generation of arbitrary views of a particular geologic structure as well as a mathematical representation of the structure. The data is used to locate potential drilling and mining locations for drilling oil or other minerals. In order to provide accurate interpolation from the sparse two dimensional data, both apparent and true dip characteristics are obtained for the surveyed structure, and seismic trace data for a desired point are synthesized as a function of the dip of the surveyed structure. The dip characteristics are obtained from partial derivatives of the two dimensional data in specified coordinate directions. A three dimensional surface corresponding to the dip characteristics is obtained by a least squares fitting technique. The data obtained at the known points are weighted both by distance from the desired point and the semblance coefficients associated with dip for these points to synthesize the desired data.

19 Claims, 5 Drawing Sheets

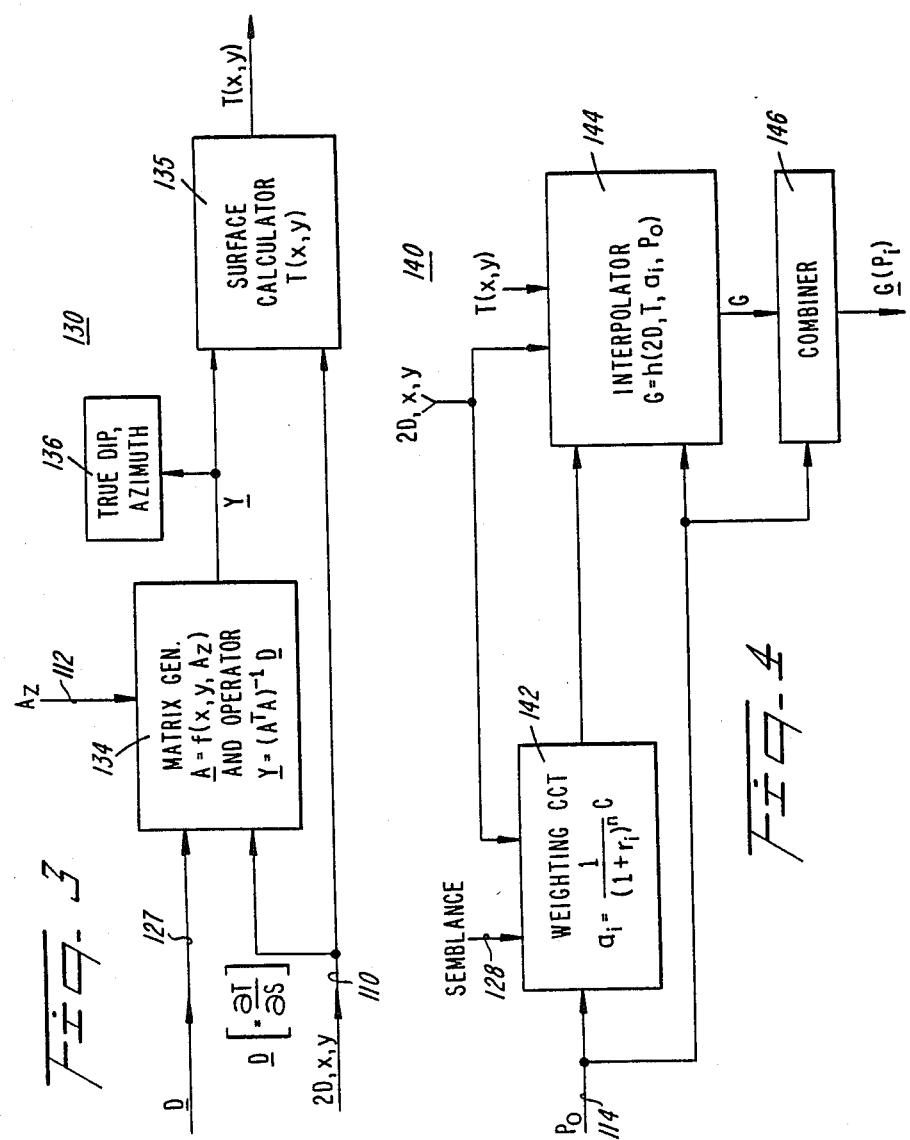

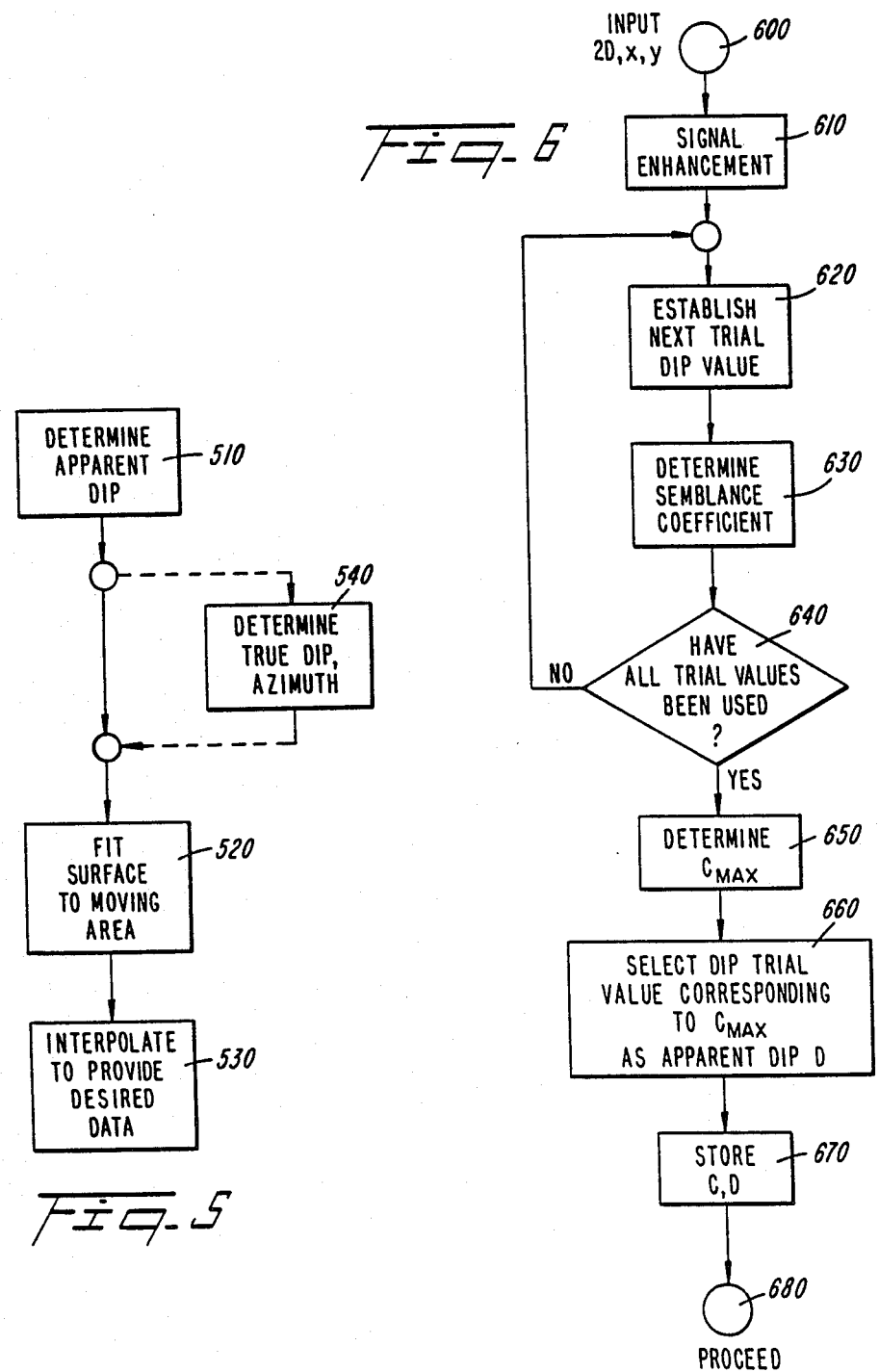

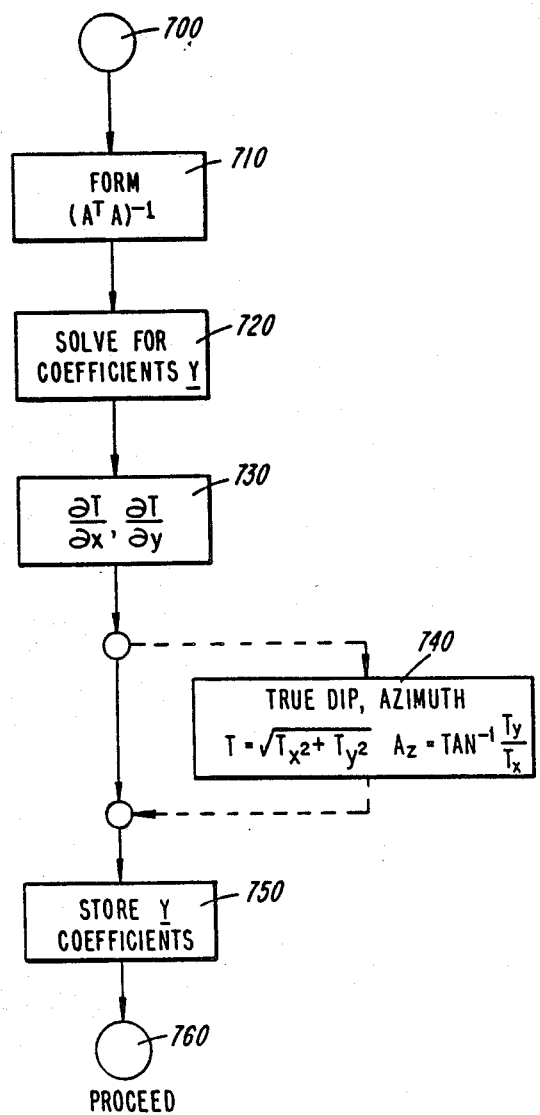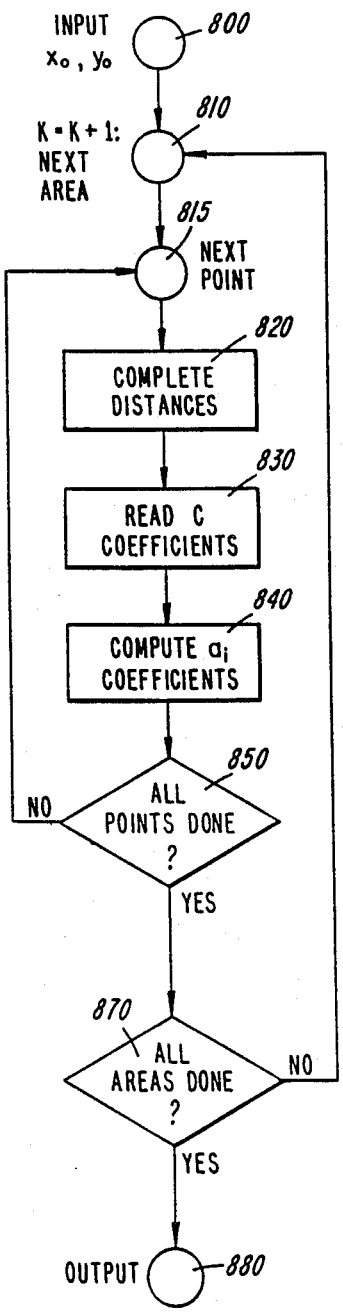

METHOD FOR SELECTION OF MINING AND DRILLING SITES USING SYNTHESIZED THREE DIMENSIONAL SEISMIC DATA

CROSS-REFERENCE TO RELATED APPLICATION

This application is a continuation-in-part of applicants' copending application U.S. Ser. No. 597,598, filed Apr. 6, 1984, for METHOD AND APPARATUS FOR SYNTHESIZING THREE DIMENSIONAL SEISMIC DATA, which is U.S. Pat. No. 4,672,545, issued June 9, 1987.

TECHNICAL FIELD

This invention relates to seismic prospecting, by reflection or diffraction of various signals provided to interfaces between geologic structures, and more particularly to method and apparatus for reducing the cost and increasing the reliability of selecting mining sites for mining a mineral utilizing two dimensional survey data including apparent and true dip data for a surveyed structure or surface and using three dimensional seismic signal data derived for arbitrary points as a function of the two dimensional seismic data obtained for other points.

BACKGROUND ART

In selecting a mining site for a mineral, such as selection of a drilling site for an oil well, it is known to rely on previously obtained prospecting data. Since the costs of drilling a well (or sinking a mine shaft) are quite high, it is desirable to minimize the number of selections of wrong sites prior to selection of the correct mining site. However, it is also expensive to increase the amount of seismic data to be used in making site selections for mining or drilling. Thus, it is known to use various techniques to increase the signal to noise ratio of seismic traces obtained during prospecting of a target mining area. That is, several methods are known to highlight the information contained in the seismic traces generated as a result of seismic prospecting.

In seismic prospecting as contemplated herein, there is provided a source of energy, typically sonic energy, which is generated at or near the surface of the earth or of a body of water in offshore prospecting In that regard, it will be understood that "sonic energy" or "seismic energy", as used herein, includes all possible types of wave propagation in seawater and in the earth, As is known, in sonic prospecting the generated energy travels through the earth or water medium to discontinuities and interfaces among various strata thereof. At each such discontinuity or interface, there is provided both a reflected and a diffracted seismic wave. These waves in turn return to the surface and are detected by a plurality of seismic transducers, which may be hydrophones or geophones, for example, arranged along a seismic line having a particular geographic orientation. The magnitude and phase displacement between the returning signals and the originally generated signals are indicative of the displacement between the source of the seismic signals and the reflecting and/or diffracting interface. The data obtained by a plurality of linear arrangements of such transducers may be used to map the various interfaces and discontinuities.

Thus, the various subsurface earth formations, as well as sub-oceanic formations, may be explored for valuable resources in reliance on the seismic prospecting data. It should be noted that many techniques are known for obtaining the prospecting data.

In these techniques, one or more seismic "shots" are generated at one or more "shot points" in any suitable manner, such as by explosion of a dynamite charge, dropping explosive charges or other weights, pulsing an underground or underwater transducer, generating gas explosions, using air guns, using hydraulic thumpers, etc. In each case, seismic energy is generated and transmitted in many directions, including downwardly to a series of geologic strata or formations. As noted above, the energy is reflected by the formations and is detected by one or more detectors along or near the surface, arranged in a predetermined pattern.

Each of the commonly used techniques processes the arriving signals, provided by the detectors, to compute two way travel time for a shotpoint at the detector location, including travel to and from a reflecting interface structure.

In the known approaches, one or a sequence of seismic energy transmissions are initiated by the one or more shot points, the energy reflected by the discontinuities or other subsurface structures being detected by the above described transducers. Seismic prospecting of sub-oceanic structures is frequently accomplished by having an exploration vessel towing a seismic streamer, having plural pressure sensitive detectors or hydrophones thereon. Impulsive sources, such as explosives or air guns, may also be towed by the vessel.

The source transducers are fired and the echoes of the energy thus generated are received by the hydrophones as variations in pressure, are converted to electrical signals, digitized, and are recorded against time (on paper or magnetic media) as seismic traces for later use in interpretation of the subsurface structures and for use in selection of appropriate mining or well drilling sites.

For offshore prospecting, wherein a plurality of geophones may be spaced fairly closely to one another (approximately 82 feet apart, for example) along a single seismic line, the various lines are typically placed on the order of one-half mile to one mile apart from one another. Thus, although return data are relatively dense in a longitudinal direction determined along the seismic lines of geophones, these data are nonetheless relatively sparse in the direction transverse thereto. Any determinations of dip and/or strike in the transverse direction are thus subject to error because of the relatively large transverse discontinuities between transducers.

In order to provide more accurate representation of subsurface geological structures, more detailed sampling of the subsurface areas are required. Such increased detail is available by providing more dense, e.g., three dimensional, seismic coverage over the exploration area, rather than standard two dimensional data collected by individual lines of receivers to provide a profile representation of the surveyed structures. In the three dimensional seismic prospecting process, the seismic lines of transducers are repositioned at substantially closer transverse intervals to one another than in the conventional approach.

By obtaining the more densely and uniformly packed seismic data, the spurious assumption that the surveyed geologic structure is two dimensional is no longer required. Thus, the received data are manipulated and processed as a true three dimensional wave field, in accordance with correct physical principles. With such processing, the received seismic energy is better imaged to reveal the subsurface geology than the two dimensional representations thereof. Additionally, the availability of three dimensional data permits an interpreter to view the surveyed structure in a three dimensional perspective, either through a time-slice of the seismic data or by obtaining a vertical slice at any orientation. Such flexibility in display makes the seismic interpretation easier, faster and more accurate.

However, because of the time consumptive nature of the seismic prospecting process, it is substantially more expensive to obtain such more highly densely packed three dimensional data than it is to obtain the standard (two dimensional) prospecting data. There is accordingly a need in the prior art to provide a method and apparatus for obtaining three dimensional, densely packed, seismic prospecting data in a less expensive manner, thereby to enable more accurate seismic prospecting of geologic structures More specifically, it is desirable to be able to regrid existing two dimensional data in a manner to provide three dimensional seismic data, thereby enabling large quantities of data to be evaluated quickly and accurately. A number of unsuccessful attempts have been made in the prior art to regrid such two dimensional data with the aid of varying computational techniques. In addition to requiring seismic data obtained by perpendicular seismic lines, a further significant problem with the prior art is the inability of such regridding programs to function for structures which deviate from a very flat configuration between the points mapped by the two dimensional technique. There is thus a need in the prior art to provide a method for regridding two dimensional data to provide a true three dimensional representation of the surveyed structure.

It is accordingly an object of the present invention to overcome the difficulties of the prior art, to obtain two dimensional seismic data, and to derive therefrom three dimensional, or densely packed, seismic data for selection of appropriate mineral mining or oil drilling sites.

Yet another object of the invention is the selection of mining or drilling sites based on interpolated, three dimensional data derived from two dimensional seismic prospecting data.

It is a more specific object of the invention to provide three dimensional seismic prospecting data for location of mining or drilling sites without requiring a more dense and expensive positioning of various geophones for receiving the reflected and diffracted seismic signals.

It is another object of the invention to provide a method and apparatus for obtaining sparse, two dimensional, data representative of a geological structure or surface, converting the sparse data to more accurate and densely packed three dimensional data representative thereof, and for mining for a mineral based on the combined sparse and densely packed data.

It is still another object of the invention to obtain a mathematical representation of the geologic structure being surveyed by performing operations on sparse, two dimensional, seismic data signals representative thereof, and to select appropriate well drilling sites with greater reliability based on the mathematical representation.

An additional object of the invention is the conversion of two dimensional seismic data to three dimensional, more densely packed, data representative of a geologic surface corresponding to the surveyed structure in order to enable selection of the drilling sites with increased reliability.

Still another object of the invention is the provision of data descriptive of a geologic structure, obtainable at any arbitrarily selected point with respect to said structure, from previously obtained two dimensional seismic prospecting data representing said structure and thus to enable selection of the drilling sites with increased reliability.

Yet a further object of the invention is providing an increased accuracy in mine and well selection decisions by relying on data obtainable by a seismic line, disposed at an arbitrary orientation with respect to a geologic surface, from standard two dimensional prospecting data descriptive of the structure.

It is a further object of the invention to convert sparse, two dimensional, seismic data descriptive of a geologic structure to dense, three dimensional, data descriptive of the structure without the necessity of placing additional lines of transducers or of obtaining additional data and thus to reduce the cost of selecting a proper drilling site in order to reduce.

Yet another object of the invention is the regridding three dimensional seismic data from existing two dimensional data representing a geologic structure in order to reduce the cost of selecting a proper drilling site.

DISCLOSURE OF INVENTION

To achieve the foregoing and other objects, and in accordance with the purposes of the present invention as described herein, there is provided an improved method for selecting a location for extracting minerals including the steps of prospecting a target mining area to investigate subsurface structures, obtaining seismic signals at predetermined locations for representing reflections of seismic energy by subsurface structures and interfaces, synthesizing seismic data to represent signals obtainable at locations other than the predetermined locations, thereby obtaining a more dense representation of the subsurface structures and interfaces, and using the seismic traces and the synthesized seismic data to select a mining location.

Preferably, the step of synthesizing the seismic data includes the further step of obtaining a three dimensional representation of the subsurface structures and interfaces.

In accordance with a more particular aspect of the invention, the step of obtaining seismic signals includes a number of substeps. Thus, the seismic signals are obtained after determining locations to be prospected seismically providing seismic lines at the predetermined prospecting locations and generating seismic energy for reflection by the subsurface structures and interfaces. The echoes of the seismic energy reflected by the subsurface structures and interfaces are detected to obtain the seismic signals.

In accordance with yet another aspect of the invention, using the seismic traces and data to select a mining location also includes the further step of mining the mineral from the selected location. Inasmuch as the mineral to be extracted is preferably oil, the mining step includes the step of drilling for oil.

From a more detailed perspective, the step of synthesizing seismic data to represent signals obtainable at locations other than the predetermined locations of physical seismic lines includes a number of detailed substeps. Thus, there is preferably included the step of regridding two-dimensional seismic signals obtained at the predetermined locations in order to produce the synthesized seismic data providing a three dimensional representation of the geologic structure. Moreover, it is contemplated that a three dimensional surface representing the geologic structure is calculated on a programmed computer. Based on the calculated three dimensional surface, additional seismic data is calculated on the programmed computer, the additional data corresponding to the geologic structure and detectable at an additional point other than the predetermined locations. Synthesized seismic signals are generated, representing the additional seismic data and receivable at the additional point.

In accordance with another feature of the invention, the three dimensional surface representing the geologic structure is obtained by determining, from the two dimensional seismic data, apparent dip characteristics of the geologic structure for the predetermined locations at which the seismic signals were received. Together with the apparent dip characteristics there are determined respective semblance coefficients associated therewith for the predetermined locations at which the seismic signals were received. Moreover, from the apparent dip characteristic and from location data identifying a particular point, the three dimensional surface characterizing the geologic structure are determined.

Additional objects, advantages and other novel features of the invention will be set forth in part in the description which follows and in part will become apparent to those skilled in the art upon examination of the following or may be learned with the practice of the invention. The objects and advantages may be realized and attained by means of the instrumentalities and combinations particularly pointed out in the appended claims.

BRIEF DESCRIPTION OF THE DRAWINGS

The accompanying drawings, incorporated into and forming a part of the specification, illustrate several aspects of the present invention and, together with the description, serve to explain the principles of the invention. In the drawings:

FIG. 3 shows details of a true dip calculator utilized in FIG. 1A;

FIG. 4 provides additional details of a trace synthesizer in FIG. 1A;

FIG. 5 broadly shows some of the steps used in the present inventive method;

FIGS. 6, 7 and 8 show flow charts describing a sequence of steps which may be carried out by a computer in performing the inventive method.

Reference will now be made in detail to the present preferred embodiment of the invention, an example of which is illustrated in the accompanying drawings.

BEST MODE FOR CARRYING OUT THE INVENTION

As is apparent from the foregoing discussion of the background of the invention, methods for obtaining seismic traces as indications of geologic structures and interfaces between such structures are well known in the prior art. The present invention permits the plotting of accurate seismic data for points at which no such data were actually obtained and thus the selection of appropriate drilling and mining sites for oil or other minerals. That is, seismic traces are synthesized for points intermediate points at which seismic signals were actually received. A novel aspect of the present invention is the provision of a method for determining the three dimensional surface data for the geologic structures being surveyed, the geologic structure information thereafter being used in synthesizing the seismic traces and in aiding selection of the drilling sites.

Figure 1A:
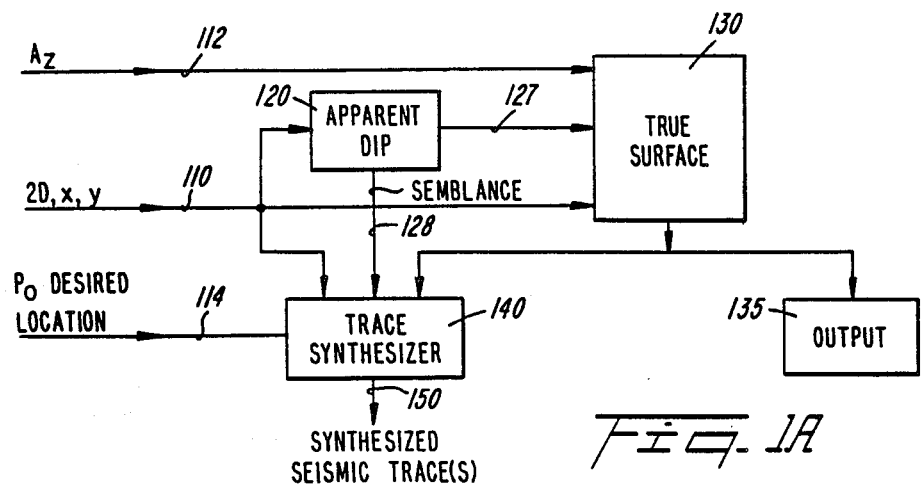
FIG. 1A broadly shows a system in accordance with the present invention for providing one or more synthesized seismic traces at arbitrary desired locations from input two dimensional seismic signals together with azimuth data therefor.
Figure 1B:
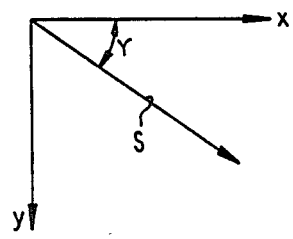
FIG. 1B is a plan view of a line of seismic transducers and its orientation with respect to a pair of coordinate axes.

Referring now to FIG. 1, there is broadly shown, in bock diagram format, an illustration of a structure embodying an apparatus used in carrying out the present invention. As shown therein, input signals, conveying two dimensional seismic information obtained along one or more seismic lines shown in FIG. 1B, together with the azimuthal orientation (Az) of that line, are provided on input lines 110 and 112, respectively. More specifically, although single lines are shown at 110 and 112, it should be recognized that a plurality of input lines may be included in a cable providing the input signals to various computing components of the inventive structure.

Thus, on line 110 there are provided the standard, two dimensional, seismic data obtained as a plurality of seismic traces along the line S including a plurality of geophones (not shown). For each set of data obtained on a particular seismic line and provided on line 110, there is provided on line 112 the azimuth information identifying the location and orientation of the seismic line used to obtain the data.

Also input to the structure is information on line 114 identifying the location of a point for which a seismic trace is desired The seismic data obtained from the plurality of geophones are provided to a first computing device 120, which may be an appropriately programmed computer for example, for calculating apparent dip information for the geologic structure observed along the seismic line. This seismic time dip is a measurement of time step-out across the plurality of seismic traces and may be measured directly and accurately from the received seismic data in accordance with well known processes.

In order to obtain a dip angle section, representing the time dip for data taken along the seismic line, the dip angle is preferably determined at each time sample for each of the seismic traces forming the original seismic data. The resulting dip angle information thus corresponds to the data points observed in the original seismic line profile of the geologic structure.

It should be noted, however, that the time dip observed along a number of seismic traces taken along a seismic line does not necessarily reflect the true dip of the underlying geologic structure, but merely provides an apparent dip thereof. Specifically, if the data were reflected or diffracted only by points along the structure which are vertically below the seismic line, or alternatively only by points having a particular fixed angular inclination with respect to the line, then an actual correlation would exist between the observed time dip and the actual dip of the structure. However, inasmuch as the signals received by the various geophones along the seismic line in fact may be reflected by additional points, or by a single point at different times, the time dip observed along the several seismic traces merely provides an apparent dip for the underlying geologic structure and is not necessarily the true dip of the geologic structure immediately below the line.

The present invention accordingly provides a second computing device 130 for calculating the data representing the actual surface variations of the underlying geologic structure. As will be apparent from the following description, the surface calculator 130 provides information useful in obtaining the desired synthesized seismic trace as an interpolation of data obtained at actual seismic trace points on seismic lines of any orientation. Moreover, the apparent dip data are used to obtain a mathematical formulation of the actual geologic structure being surveyed by utilization of a least-squares fitting method. The three dimensional surface thus obtained is useful in permitting an interpreter to observe the geologic structure in a three dimensional perspective, either through a time slice of the seismic data representing an elevation at an arbitrary depth or through a vertical slice obtained at any orientation, simulating data obtainable by an arbitrarily placed seismic line without the necessity of incurring the expense of such a procedure. Towards that end, the output data of the calculator 130 may be stored for subsequent access and for output either as a display or as a hard copy, as symbolized by an output device 135. As will be further apparent from the following discussion, the structural data are calculated by the device 130 as a function of the apparent dip information produced by the first computing device 120, as well as azimuthal data provided on line 112 and the seismic data provided on line 110.

With the aid of the true surface structure data, the two dimensional seismic data input on line 110 may be appropriately interpolated to provide a synthesized seismic trace for any desired location, identified by input data provided on line 114, by a trace synthesizer 140.

A significant advantage of the present invention is the provision of semblance coefficients, which are used by the first computing device 120 to select an apparent dip, to the trace synthesizer The semblance coefficients are used to weight the contributions of the actual seismic traces obtained along the survey lines in synthesizing the trace for the desired location. The calculated structure is used to vary the observed seismic data and to provide an interpolated value for the desired location.

The structure of FIG. 1A thus provides an output at line 150 representing a seismic trace observable at a desired location indicated by data input on line 114, based on the semblance coefficients obtained for the apparent dip, on the actually observed two dimensional seismic data, and on the computed three dimensional geologic structural data. By synthesizing seismic traces for a plurality of locations distributed along a particular line, it should be clear that a complete vertical seismic profile may be obtained, illustrating the data obtainable along a line of seismic transducers at an arbitrary location.

Figure 2:
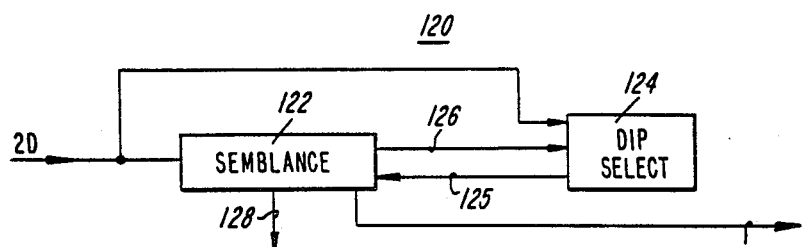
FIG. 2 shows the apparent dip calculator of FIG. 1A in greater detail.

FIGS. 2, 3 and 4 provide details of components shown at 120, 130 and 140 in FIG. 1, respectively. Thus, as shown at FIG. 2, the apparent dip calculator 120 may in fact comprise a semblance coefficient calculator 122 and a trial dip selecting circuit 124. In operation, for each trial dip value selected by circuit 124 the semblance coefficient calculator computes a semblance, or coherence, coefficient in a manner known in the art. The semblance coefficient is determined for each trial dip value and the dip value having the largest semblance coefficient is selected as the apparent dip for the particular data point under consideration.

More specifically, the apparent dip at a specific data point is determined by setting a time window, centered about the data point, and determining a coherence value for dip lines drawn within that window across several traces, ranging from a maximum negative dip angle to a maximum positive dip angle by successive small dip angle increments. The semblance coefficient calculator 122 performs a coherence test for each trial dip value by calculating a semblance coefficient C in accordance with the expression shown in Equation (1).

$$C = (1/M) \sum_t \left[ \sum_i f_{i, t(i)} \right]^2 / \sum_t \sum_i f^2_{i, t(i)} \quad (1)$$

Where:
M is the number of seismic traces,
i denotes the index of the seismic trace,
t denotes the seismic time sample, and
$f_{i, t(i)}$ is the seismic amplitude at the $i^{th}$ trace and the $t^{th}$ time sample.

The semblance coefficient is a figure of merit for the trial dip angle value and measures how well the seismic events are lined up for that angle. The apparent dip angle is selected as that angular orientation for which the maximum coherency is detected among all possible orientations, or trial dip values. In the present invention, the semblance coefficient C for the selected dip angle value is saved along with the apparent dip value thus determined.

This coefficient represents a normalized output/input energy ratio and ranges in value from 0 to 1, corresponding to a coherence among the aligned seismic events along the trial dip line ranging from no coherence to perfect coherence, respectively. Thus, for each data point, obtained at every time sample (taken at four milisecond intervals, for example) the apparent dip is selected as that angular orientation for which the seismic events on adjacent traces within the selected time window line up most coherently.

It should be appreciated that for seismic traces having a duration of approximately four seconds, approximately one thousand data samples are obtained when taken at four millisecond intervals. Further, where three hundred geophones are to be used in a single seismic line, the provision of accurate apparent dip information in accordance with the above described method requires the coherence calculations to be performed over selected wind for approximately 300,000 data points. Additionally, a large number of seismic lines are typically used in order to map a single geologic structure, each line generating data requiring 300,000 complex computations. Accordingly, the apparent dip calculating device 120, and more particularly the semblance coefficient calculator 122, is preferably a high speed, large capacity, programmed digital computer for rapidly performing the above-described computation of Equation (1) for a large number of data points.

In operation, the dip selecting circuit 124 selects a sequence of data points from adjacent seismic traces at incremented dip angles For each selected combination, there is provided to the coefficient calculator 122 an indication on line 125 of the now current trial dip angle value. In response to receipt of data on line 125, the semblance coefficient calculator 122 computes the semblance coefficients in accordance with Equation (1). After receiving all such trial dip angle values, the largest semblance coefficient computed for that data point is determined, such as by a procedure whereby the trial dip angle and the computed semblance coefficient therefor are stored in a pair of registers only if the computed coefficient is greater than the previously stored value therein.

Upon conclusion of the trial sequence, the semblance coefficient calculator 122 thus outputs a signal on line 126 causing the dip selecting circuit 124 to reset, and at the same time provides on line 127 an output indicative of the stored dip angle value as previously described. Similarly, the calculator 122 outputs on line 128 the semblance coefficient, for use in trace synthesizer 140 as previously described. Thus, the first computing device 120 in fact provides output signals representing the apparent dip for each specific data point and the semblance coefficient for the determined apparent dip to be associated with that data point.

Referring now to FIG. 3, there is shown in greater detail the second computing apparatus 130 used to calculate the surface of the geologic structure.

More specifically, the apparent dip information input on line 127 provides an input signal indicative of the partial derivative of the seismic data with respect to the azimuth direction of the seismic line used to obtain the seismic data Referring again to FIG. 1B, which shows a seismic line S oriented at an angle $\gamma$ with respect to the rectangular x and y coordinates, it may be concluded that if the azimuthal direction along the seismic line is defined as a direction S, then it is possible to obtain the true surface, T(x,y) from the solution of a partial differential equation of the type shown at Equation (2).

$$\frac{\partial T}{\partial S} = \frac{\partial T}{\partial x} \frac{\partial x}{\partial S} + \frac{\partial T}{\partial y} \frac{\partial y}{\partial S} \tag{2}$$

Thus, where T represents the surveyed three dimensional structure and S represents the direction of the seismic line observing the data ($\partial T/\partial S$ representing the apparent dip determined by the first computing device 120), applicants have recognized that application of a standard mathematical equation of the type shown in Equation (2) leads to the determination of the three dimensional surface T(x,y) and hence the true dip for the geologic surface being surveyed. This may be seen more specifically with the aid of FIG. 1B wherein it is noted that the relationships of Equation (3) are applicable.

$$\frac{\partial x}{\partial S} = \cos \gamma, \frac{\partial y}{\partial S} = \sin \gamma \tag{3}$$

Substitution of the values of Equation (3) in Equation (2) results in a scalar Equation (4):

$$\frac{\partial T}{\partial S} = \frac{\partial T}{\partial x} \cos\gamma + \frac{\partial T}{\partial y} \sin\gamma \tag{4}$$

This equation represents the dip of the geologic surface taken along the seismic line used to obtain the data, shown as $\partial T/\partial S$, in terms of coefficients (cos $\gamma$ and sin $\gamma$) known from azimuthal data and in terms of the directional partial derivatives of the surveyed surface, or the apparent dip, in the x and y coordinate directions. From this equation, a solution may be obtained for T(x,y).

The present invention thus utilizes apparatus for applying the equations as determined above to obtain a solution for a function T(x,y) representing the surface being surveyed by the many data points.

In order to solve Equation (4), the dipping surface T(x,y) may be assumed to be represented by an arbitrary equation of $k^{th}$ order. For a second order equation, this is shown by Equation (5):

$$T(x,y) = ax^2 + by^2 + cxy + dx + ey + f \tag{5}$$

For such an assumed functional representation of the dipping surface, the partial derivatives required for solution of Equation (4) are represented by Equations (6):

$$\begin{aligned} \partial T/\partial x &= 2ax + cy + d \\ \partial T/\partial y &= 2by + cx + e \end{aligned} \tag{6}$$

Upon substitution of Equations (6) into Equation (4), there results Equation (7):

$$\partial T \partial S \equiv D = \tag{7}$$
$$(2x\cos\gamma)a + (2y\sin\gamma)b + (y\cos\gamma + x\sin\gamma)c + (\cos\gamma)d + (\sin\gamma)e$$

Since the value D is known as a result of the apparent dip computation performed by the first computing structure 120, for particular data points and for particular values of angle $\gamma$ corresponding to actual seismic lines, there is available a substantial quantity of data at various x and y coordinates for solution of the coefficients a through e of Equation (7).

Although any approach for solution of a plurality of equations may be used, a matrix approach, which is easily implemented on programmed digital computers, is preferred. Such a solution is illustrated by the following.

For a single time slice, let it be assumed that N measurements are available from the two dimensional profiles. Where N is larger than the number of coefficients to be determined, the coefficients (a through e in Equation (7)) may be solved by a least-squares method. The N measurements provide N representations of Equation (7) as follows:

$$D_1 = (2x_1\cos\gamma_1)a + \tag{$7_1$}$$
$$(2y_1\sin\gamma_1)b + (y_1\sin\gamma_1 + x_1\cos\gamma_1)c + (\sin\gamma_1)d + (\cos\gamma_1)e$$
$$D_2 = (2x_2\cos\gamma_2)a + \tag{$7_2$}$$
$$(2y_2\sin\gamma_2)b + (y_2\sin\gamma_2 + x_2\cos\gamma_2)c + (\sin\gamma_2)d + (\cos\gamma_2)e$$
$$D_N = (2x_N\cos\gamma_N)a + \tag{$7_n$}$$
$$(2y_N\sin\gamma_N)b + (y_N\sin\gamma_N + x_N\cos\gamma_N)c + (\sin\gamma_N)d + (\cos\gamma_N)e$$

In matrix form, the above system of equations may be written as Equation (8):

$$AY = T \tag{8}$$

-continued

Where:

$$T = \begin{bmatrix} D_1 \\ D_2 \\ \cdot \\ \cdot \\ \cdot \\ D_N \end{bmatrix},$$

$$A = \begin{bmatrix} 2x_1\cos\gamma_1 & 2y_1\sin\gamma_1 & y_1\sin\gamma_1 + x_1\cos\gamma_1 & \sin\gamma_1 & \cos\gamma_1 \\ 2x_2\cos\gamma_2 & 2y_2\sin\gamma_2 & y_2\sin\gamma_2 + x_2\cos\gamma_2 & \sin\gamma_2 & \cos\gamma_2 \\ \cdot & & & & \cdot \\ \cdot & & & & \cdot \\ \cdot & & & & \cdot \\ 2x_N\cos\gamma_N & 2y_N\sin\gamma_N & y_N\sin\gamma_N + x_N\cos\gamma_N & \sin\gamma_N & \cos\gamma_N \end{bmatrix}$$

$$Y = \begin{bmatrix} a \\ b \\ c \\ d \\ e \end{bmatrix}$$

The least-squares solution for the matrix Equation (8) is given by:

$$Y = (A^T A)^{-1} D \quad (9)$$

where superscripts $-1$ and T denote the inverse and transpose, respectively, of a matrix.

The above computation is carried out by a matrix generator and calculator 134 shown in FIG. 3, wherein the matrix A is found as a function of azimuthal angle $\gamma$ of seismic lines and of the x and y coordinate locations of individual data points, as shown above, and wherein the individual coefficients of the surface Equation (5) are found by the matrix transposition and inversion operation represented by Equation (9).

It is noted that coefficient f of the time surface equation is omitted from the entire calculation. This result occurs because the dip involves only partial derivatives, and any constant term should play no role in the calculation. Except for this unimportant DC shift (represented by a constant time shift), the time representation of the surveyed surface is thus entirely determined from the estimated coefficients. Specifically, having determined the coefficients a, b, c, d and e, the equation describing the surface being surveyed is easily determined from Equation (5), within the above mentioned constant shift. Substitution of the coefficients in the equation is accomplished by a calculator 135 which provides an output indicative of the surface for any desired coordinate pair x, y. Since the present apparatus measures only a rate of time changes in seismologic phenomena, the coefficient f is not necessary to practice the invention.

Moreover, once the coefficients have been determined, apparent dip in any direction can be calculated from Equations (4) and (6) and, moreover, true dip and true azimuth are given by:

$$\text{True dip} = \sqrt{(\partial T/\partial x)^2 + (\partial T/\partial y)^2} \quad (10)$$

$$\text{True azimuth} = \tan^{-1}[(\partial T/\partial y)/(\partial T/\partial x)] \quad (11)$$

These operations may, if desired, be implemented in a straightforward manner on a programmed computer, as illustrated by a calculating apparatus 136 of FIG. 3. This device, in response to input coefficients Y and to the input location data for a specified point, may thus compute the partial derivatives of the surface equation in Equations (6), and then determine therefrom the true dip and azimuth in accordance with Equations (10) and (11).

It should be pointed out that in the least squares calculation, the semblance coefficients from the dip search program carried out by the first computing device 120 are used as statistical weighting factors so that the structure surface will represent the "good" dip values more heavily than the "poor" values.

Inasmuch as the surveyed structural surface is better approximated by local application of a mathematical surface to the data, the surface fittings contemplated by Equation (9) are done in a predetermined small area. The area is moved for each fitting, with a predetermined overlap of the points previously covered in order to insure the continuity of the fitting surfaces Such moving area fitting is performed by causing the structure of FIG. 3 to operate on successive sets of data points, which sets include common points representing the overlap.

Trace interpolation is performed along the structural dip by trace synthesizer 140 of FIG. 1A by finding the time differential of the time surface between the interpolated point and the surrounding seismic traces and generating the appropriate data, which forms the desired synthesized seismic trace The amplitude of the interpolated trace is reconstructed from the amplitudes of the surrounding traces as weighted by the previously mentioned weighting factors, specifically the distances between the arbitrary point and the known data points and the semblance coefficients.

The structure shown in FIG. 4 is used to compute the interpolated data and synthesized seismic traces in accordance with the following equation:

$$G(x_o, y_o, t_o) = \sum_{i=1}^{M} a_i S(x_i, y_i, t_o + \Delta t_i) / \sum_{i=1}^{M} a_i \quad (12)$$

In the equation, $G(x_o, y_o, t_o)$ is the amplitude of an interpolated trace at an arbitrary location $(x_o, y_o)$ and time slice $t_o$ $(x_i, y_i)$ are coordinates of $i^{th}$ seismic trace $\Delta t_i = T(x_i, y_i) - T(x_o, y_o)$ $S(x_i, y_i, t_o + \Delta t_i)$ is the amplitude of seismic trace at location $(x_i, y_i)$ and time $t_o + \Delta t_i$ $a_i$ is the weighting factor for $i^{th}$ trace, and M is the number of traces used for reconstruction.

More specifically, Equation (12) represents a summation of appropriately weighted seismic data, obtained at various points $x_i$, $y_i$ and at various times corresponding to the dip between the data point and the arbitrary point at which the trace is desired.

It is noted that M, the number of traces surrounding the interpolated trace that are summed to produce the interpolation output, is a function of Fresnel zone and should be time variant The areal extent of Fresnel zone gets larger as the wave propagates more deeply and consequently more traces should be used for reconstruction The weighting coefficients $a_i$ decay as an inverse of the distance with a power factor between 1 and 2 according to Kirchhoff's Wave Theory. The coefficients $a_i$ are also further modified by the semblance coefficient to weight the good dip data more heavily. The coefficients $a_i$ expressed in mathematical form are given by Equation (13):

$$a_i = [1/(1+r_i)^n] \times C \quad (13)$$

where $r_i$ is the distance between $(x_o, y_o)$ and $(x_i, y_i)$ C is the semblance coefficient, and n is the power factor. In the preferred embodiment, the value of n is 1.5.

The trace synthesizer 140 performs the interpolation function and the weighting function, and includes structure shown in FIG. 4 for performing these functions. Specifically, a weighting coefficient calculating circuit 142 receives the semblance coefficients output by the semblance coefficient calculator 122 on line 128, together with the x,y coordinate locations associated with the two dimensional seismic data points, in order to compute the weighting coefficient in accordance with Equation (13). As will be appreciated, calculating circuit 142 may be provided in the form of a programmed digital computer.

An interpolator circuit 144, similarly comprised of programmed computing apparatus, is provided for calculating the results of Equation (12). As is apparent from the equation, interpolator circuit 144 is connected to receive inputs from the surface calculator 130, to permit computation of $\Delta t_i$ in Equation (12). Additional inputs to the interpolator are the coefficients determined by weighting coefficient calculating circuit 142 and the coordinates of the arbitrary point for which it is desired to synthesize a seismic trace. The two dimensional seismic data previously obtained are also input to the interpolator as needed.

The resulting values $G(x_o, y_o, t_o)$ output by interpolator 144 represent seismic data obtainable at a point $x_o, y_o)$ for a time $t_o$, as dependent upon the surface equation for the surveyed structure computed by the surface calculator 130. The present invention thus provides a synthesized seismic trace for any arbitrary point as a function, inter alia, of the seismic data obtained at other points of the calculated representation of the structure, of the distance between the known data points and the arbitrary point, and of the semblance coefficient of the apparent dip at the known data points.

It is recognized that large amounts of data must be manipulated to achieve the above described function. Advantageously, the present invention does not require use of computing and calculating devices having a storage capable of storing all the data. Devices with reduced storage capability may be used upon recognition that, in accordance with Equation (13), the contribution of data from far distant data points diminishes and, beyond some distance, is effectively zero. Accordingly, the inventive method and apparatus provide and require storage for data from only a limited number of data points, from an area proximate the arbitrary point in the computation represented by Equation (13) as well as in the computation of the surface $T(x,y)$ represented by Equations (8) through (9). Specifically, data from successive areas $A_1, A_2, \ldots, A_N$ are used for computation of a portion of surface $T(x,y)$ and of the desired seismic data for points within these areas. Preferably, for every set of desired points an area may be defined including these points and a sufficient number of data points removed therefrom by distances short enough to permit contributions to Equations (12) and (13). Thus, the surface equation $T(x,y)$ need only be determined for one area at a time, rather than for the entire surface at once. The complexity of the functions performed by the structure of FIG. 3 is thus significantly diminished In order to assure continuity of the calculated surface, the areas $A_1, A_2, \ldots$ are selected to overlap one another for a number of data points. Preferably, 50% overlap is provided for the areas to provide substantial continuity of the calculated surface which is thus calculated in a piecemeal, "moving area", technique. Seismic data for any point may thus be calculated from the seismic data for data points of a particular area with the aid of the surface representation obtained by a least-squares fit for that area. Of course, the area selected for computation of the surface may be smaller than the area containing all points making a contribution to the seismic trace to be synthesized for the arbitrary point. Thus, data from points in a number of the areas may be used in Equations (12) and (13).

In operation, the contribution of the known seismic data to the desired point $(x_0, y_0)$ by the summation of Equation (12) is determined by areas. The contributions of each known data point $(x_i, y_i)$ in one area of the surveyed structure, represented by $iT(x,y)|A_k$, are summed over the index i for points within area $A_k$. Subsequently, when the mathematical surface function $T(x,y)|A_{k+1}$ is determined for the next overlapping area, the contribution of seismic data from data points within this area is made to Equation (12) for the seismic trace to be synthesized for the arbitrarily located point.

After computation of an entire seismic trace for the arbitrary point $(x_0, y_0)$, a further point is selected as a new location for the "arbitrary" point, in order to synthesize yet an additional seismic trace A set of such seismic traces may be generated for a plurality of points selected to represent a seismic line, for example, at any desired orientation, whether parallel, perpendicular, or inclined to the orientation of the actual seismic lines used in obtaining the two dimensional data. There is thus no restriction on the orientation of the seismic lines with respect to one another or on the arbitrary locations for data synthesis with respect to the seismic lines.

Such a combination of individually calculated seismic traces is relatively straightforward and performed in a combining device 146. It is noted that such a combining apparatus may in fact merely be a form of a serial-to-parallel converter, in which the serially generated seismic traces for each of a plurality of points are sequentially (i.e., serially ) input and which, after temporary storage, outputs the traces in unison (i.e. in parallel ), representing data obtainable by an entire seismic line of geophones. Alternatively, the combining device may include output display or printing devices for displaying or printing the individual seismic traces sequentially, with physical signal displacement corresponding to signals provided by a seismic line. In such a configuration, storage or refresh circuitry, or a print carrying medium, may be used to store the previously output signals for combination with a currently output signal, to provide the "parallel" representation of the output of an entire line of geophones.

Since Equation (12) provides the seismic data at arbitrary time slices, the present invention thus provides plan views at different time slices, and may be used to generate a sequence of such views, or a sequence of vertical elevations, for sequential viewing as a "movie" in aiding section of drilling sites for oil, for example.

Preferably, regridding of two dimensional data as described above should be performed on unmigrated stack data so that a three dimensional migration may be performed on the regridded three dimensional data. It is noted that unmigrated data contains both reflection and diffraction events. The present invention fits a surface to accommodate both events Although this procedure may seem odd, it should be understood that when the surface fitting is performed locally, as contemplated herein, the interpolation will honor whichever event comes out stronger. Because diffraction normally has a large dip, it is possible to interpolate reflection and diffraction separately by fine tuning the dip search; one run allows the diffraction to pass and another run allows the reflection to pass. A final section is produced by linearly superimposing the two outputs It is thus noted that the present invention includes provision of a synthesized seismic trace by carrying out the method broadly illustrated in FIG. 5. Therein, at step 510, an apparent dip is determined from the seismic data received from a plurality of geophones. A surface is fitted to a moving area in step 520. The desired data are obtained by interpolation at step 530. Additionally, an optional step 540 may be provided, wherein true dip and/or azimuth are obtained.

In more specific detail, this aspect of the inventive method may be carried out by a computer programmed to perform the steps shown in FIGS. 6, 7 and 8. In FIG. 6, at step 600 there is initially input an amount of two dimensional seismic data along with the coordinates of the various test points At step 610 an optional step of signal enhancement may be carried out, such as by performing a since function convolution.

At steps 620–660 there is determined an apparent dip angle for the input data. At step 620, a next trial dip angle value is established In the initial pass through the procedure, step 620 provides an initial trial dip angle value. Thereafter, a semblance coefficient is determined at step 630 for the dip angle value set in step 620 and, upon determining that all trial dip values have been used at step 640, the maximum semblance coefficient is determined at step 650. If all the trial dip values have not been used, the inventive method requires establishing the next trial dip value at step 620 once again.

Upon determining the maximum semblance coefficient in step 650, the corresponding dip trial value is selected as the apparent dip $\partial T/\partial S$ in step 660. Both the semblance coefficient and the thus determined dip value are stored at step 670 for utilization in determining the weighting coefficients for the data of the various points. At step 680 the method proceeds to the steps shown in FIG. 7, wherein the three dimensional representation of the surveyed surface is obtained. Therein, the apparent dip data computed at steps 610–670 and output at step 680 are obtained at step 700. The x,y coordinates of the data from step 110 and the azimuth data from step 112 are merged in step 700. Thereafter, a matrix A is formed as a function of the coordinate and azimuth data for the various geophones on the seismic lines providing the two dimensional data and the matrix product $(A^TA)^{-1}$ is obtained at step 710. A matrix operation is performed at step 720 in accordance with Equation (9) i order to solve for the coefficients of an equation (such as Equation (5)) used to represent the three dimensional surface being surveyed The apparent dip in the x and y directions is obtained at step 730 by a solution of Equations (6), as has been previously described. Finally, mathematical representation of the surface and azimuth may optionally be obtained in accordance with Equations (10) and (11) at step 740. The coefficients $\gamma$ are stored at step 750. It should be noted that the inventive method utilizes a least-squares fitting of the surface to the data, as has been previously explained, rather than force fitting a $N^{th}$ order polynomial in order to reduce the effects of error in the measured data on the results.

In FIG. 8 there is shown the sequence of steps performed in order to synthesize the seismic trace at an arbitrary point. For each point whose location is input at step 800, the distances between the point and the actual data points for one area $A_l$ of the computed surface are obtained at step 820. At step 830 the semblance coefficients are obtained, and at step 840 the weighting coefficients are computed pursuant to Equation (13). At step 850 it is determined whether the contributions to the interpolated point from all pertinent data points in that area have been obtained. If not, the process returns to step 815 for selecting the next point in the area $A_k$. Thus, steps 820–850 are repeated until contributions from all of the points in a given area have been taken into account. The weighting coefficients for data in all the significant areas are then determined by repeating the sequence of steps 815–850 for each successive area $A_k$. At step 870 it is determined whether the contributions from all the areas have been provided If not, the program returns, via step 810, to the 815–850 sequence In this process the coefficients are used to weight the true seismic data previously obtained in order to derive a computed seismic data trace for the arbitrary point in accordance with Equation (12).

Thereafter, it is determined at step 870 whether data have been generated for all of the desired areas. If not, the procedure returns to step 810. Thus, until data are obtained for all the points in an area, the method repeats the steps 815–860. Once the data have been derived for each of the desired points, the method is terminated at step 880 and the data are provided as an output.

It should be recognized that in addition to the generation of synthesized seismic traces which may be used to obtain vertical profiles, the massive amounts of data generated in the present invention may be used to obtain sectional views of the surveyed structure at any orientation. Additionally, the inventive method and apparatus may be used to remove noise from standard two dimensional seismic data in obtaining the apparent dip associated therewith. By effectively calculating a synthesized trace for each point at which a seismic trace was in fact obtained, the least-squares surface fitting approach used in the invention is seen to be usable to smooth out the effects of random noise in the actually detected seismic signals.

In such a smoothing application of the invention, although the weighting coefficient will give greatest weight to the actual data obtained at a particular point, the semblance coefficient associated with the weighting factor will tend to deemphasize such data when they are in fact noise laden and erroneous. Moreover, since the surface is obtained after a least-squares fitting, random noise associated with the various traces will be smoothed out since the surface is not required to conform to any anomalous data points or to data exhibiting significant variation from neighboring points The foregoing specification describes a method for synthesizing accurate seismic traces obtainable at arbitrary points, as interpolations of previously obtained seismic data Accordingly, data may be obtained for points at any density, thus permitting the generation of three dimensional data from two dimensional data previously obtained. Having obtained the three dimensional data, a more accurately selection of an appropriate mining (or drilling) site is possible, based on the regridded data, and the selection process is less expensively made.

Figure 9:
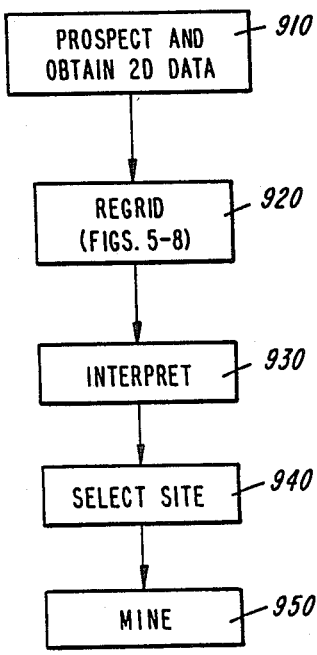
FIG. 9 incorporates the method of FIGS. 5-8 in a broad description of the present invention.

In summary, the inventive method is broadly illustrated at FIG. 9. As shown therein, a prospecting step provides two-dimensional data descriptive of the area being surveyed The data is regridded at step 920, in accordance the steps hereinabove described and illustrated at FIGS. 5-8. The regridded data is interpreted at step 930, in order to select at step 940 an appropriate mining site. Mining for the mineral is performed at step 950.

The inventive technique may be applied to automatic mapping of surveyed geologic structures, since the avaiabiity of three dimensional, closely packed, data leads to the feasibility of displaying the same in a proper perspective such as horizontal time slicing, so that an interpreter only needs to trace reflection horizons at successive time steps. Additionally, fault patterns may be better delineated with three dimensional data since the faults may be viewed from different angles. Time slices may be provided in a "movie" format, enabling a production geologist or engineer to look at a production field in snapshots available for various depths. By applying the technique to real data, there is provided a significant enhancement of the data by reducing noise and an improvement of signal to noise ratio.

Thus, with enhanced and more accurate geologic data, more accurate interpretation of the same is made possible. Accordingly, the invention permits accurate selection of drilling sites for oil, or mining sites for other minerals, whether by oceanic or landbound seismic surveying techniques The sparse, two-dimensional data obtained by conventional techniques is processed in accordance with the invention to provide more detailed information in a dense, three-dimensional format, enabling accurate location of potential drilling sites. In accordance with the invention, upon selection of the drilling or mining location, a well is drilled or a mine shaft excavated in order to access and withdraw minerals from the subterranean geologic formations.

The foregoing description of the preferred embodiment of the invention has been presented for purposes of illustration and description. It is not intended to be exhaustive or to limit the invention to the precise form disclosed. Obvious modifications or variations are possible in light of the above teaching For example, other computational techniques or devices may be used. The preferred embodiment was chosen and described to provide the best illustration of the principles of the invention and its practical application, thereby to enable one of ordinary skill in the art to utilize the invention in various embodiments and with various modifications as are suited to the particular use contemplated. It is intended that the scope of the invention be defined by the claims appended hereto.

We claim:

1. A method for selecting a location for extracting minerals comprising the steps of:
    (a) prospecting a target mining area to investigate subsurface structures;
    (b) measuring, at predetermined locations, seismic signals that represent reflections of seismic energy by subsurface structures and interfaces;
    (c) from the measured seismic signals, synthesizing seismic data representing signals measurable at locations other than said predetermined locations, thereby obtaining a more dense representation of the subsurface structures and interfaces; and
    (d) using said seismic traces and said synthesized seismic data to select a mining location.

2. A method as recited in claim 1 wherein said step of measuring seismic signals comprises the steps of determining locations to be prospected siesmically, providing seismic lines at the predetermined prospecting locations, generating seismic energy for reflection by the subsurface structures and interfaces, and detecting echoes of the seismic energy reflected by the subsurface structures and interfaces.

3. A method as recited in claim 2 wherein said step of using said seismic trances and data to select a mining location comprises the further step of mining the mineral from the selected location.

4. A method as recited in claim 1 wherein said step of using said seismic traces and data to select a mining location comprises the further step of mining the mineral from the selected location.

5. A method as recited in claim 4 wherein said mining step comprises the step of drilling for oil.

6. A method as recited in claim 1 wherein said step of syntesizing seismic data representing signals measurable at locations other than said predetermined locations, thereby obtaining a more dense representation of the subsurface structures and interfaces, comprises the further step of obtaining a three dimensional representation of the subsurface structures and interfaces.

7. A method for selecting a location for extracting minerals comprising the steps of:
    (a) prospecting a target mining area to investigate a geologic structure;
    (b) obtaining seismic signals at predetermined locations for representing two dimensional seismic data, corresponding to reflections of seismic energy by the geologic structure, as three dimensional representations thereof;
    (c) synthesizing seismic data representing signals obtainable at locations other than said predetermined locations, thereby obtaining a more dense, three dimensional, representation of the geologic structure;
    (d) said synthesizing step comprising the steps of:
        (i) regridding the seismic signals obtained at the predetermined locations, to produce the synthesized seismic data providing a three dimensional representation of the geologic structure,
        (ii) on a programmed computer calculating a three dimensional surface representing the geologic structure,
        (iii) based on the calculated three dimensional surface, calculating on said programmed computer additional seismic data corresponding to the geologic structure and detectable at an additional point other than said predetermined locations, and
        (iv) generating synthesized seismic signals representing said additional seismic data and receivable at said additional point; and (e) using said obtained seismic signals and said synthesized seismic signals to select a mining location in the geologic structure.

8. A method as recited in claim 7 wherein the geologic structure comprises subsurface structures and interfaces, and said step of using said obtained seismic signals and said synthesized seismic signals comprises selecting a mining location in the subsurface structures and interfaces.

9. A method as recited in claim 8 wherein said step of obtaining seismic signals comprises the steps of determining locations to be prospected seismically, providing seismic lines at the predetermined prospecting locations, generating seismic energy for reflection by the subsurface structures and interfaces, and detecting echoes of the seismic energy reflected by the subsurface structures and interfaces.

10. A method as recited in claim 9 wherein said step of using said obtained and synthesized seismic signals to select a mining location comprises the further step of mining the mineral from the selected location.

11. A method as recited in claim 7 wherein said step of using said obtained and synthesized seismic signals to select a mining location comprises the further step of mining the mineral from the selected location.

12. A method as recited in claim 11 wherein said mining step comprises the step of drilling for oil.

13. A method for selecting a location for extracting mineral comprising the steps of:
  (a) prospecting a target mining area to investigate a geologic structure;
  (b) obtaining seismic signals at predetermined locations for representing two dimensional seismic data, corresponding to reflections of seismic energy by the geologic structure, as three dimensional representations thereof;
  (c) synthesizing seismic data representing signals obtainable at locations other than said predetermined locations, thereby obtaining a more dense, three dimensional, representation of the geologic structure;
  (d) said synthesizing step comprising the steps of:
    (i) regridding the seismic signals obtained at the predetermined locations, to produce the synthesized seismic data providing the three dimensional representation of the geologic structure,
    (ii) obtaining a three dimensional surface representing the geologic structure by:
      (1) determining, from said two dimensional seismic data, apparent dip characteristics of the geologic structure for the predetermined locations at which said seismic signals were received;
      (2) together with the apparent dip characteristics, determining respective semblance coefficients associated therewith for said predetermined locations at which said seismic signals were received; and
      (3) determining, from said apparent dip characteristic and from location data identifying a particular point, the three dimensional surface characterizing the geologic structure;
    (iii) based on the calculated three dimensional surface, calculating on a programmed computer additional seismic data corresponding to the geologic structure and detectable at an additional point other than said predetermined locations, and
    (iv) generating synthesized seismic signals representing said additional seismic data and receivable at said additional point; and
  (e) using said obtained seismic signals and said synthesized seismic signals to select a mining location in the geologic structure.

14. A method as recited in claim 13 wherein the geologic structure includes subsurface structures and interfaces, and said step of using said obtained seismic signals and said synthesized seismic signals comprises selecting a mining location in the subsurface structures and interfaces.

15. A method as recited in claim 14 wherein said step of obtaining seismic signals comprises the steps of determining locations to be prospected seismically, providing seismic lines at the predetermined prospecting locations, generating seismic energy for reflection by the subsurface structures and interfaces, and detecting echoes of the seismic energy reflected by the subsurface structures and interfaces.

16. A method as recited in claim 15 wherein said step of using said obtained and synthesized seismic signals to select a mining location comprises the further step of mining the mineral from the selected location.

17. A method as recited in claim 13 wherein said step of using said obtained and synthesized seismic signals to select a mining location comprises the further step of mining the mineral from the selected location.

18. A method as recited in claim 17 wherein said mining step comprises the step of drilling for oil.

19. A method for selecting a location for extracting minerals comprising the steps of:
  (a) prospecting a target mining area to investigate subsurface structures;
  (b) obtaining, at predetermined locations, seismic signals that represent reflections of seismic energy by subsurface structures and interfaces;
  (c) synthesizing seismic data representing signals obtainable at locations other than said predetermined locations, thereby obtaining a more dense representation of the subsurface structures and interfaces; and
  (d) using said seismic traces and said synthesized seismic data to select a mining location.

* * * * *